Nov. 29, 1955  L. I. MENDELSOHN  2,725,266

MAGNETIC SUSPENSION

Filed April 20, 1953

Inventor:
Lewis I. Mendelsohn,
by Richard E. Hosley
His Attorney.

United States Patent Office 2,725,266
Patented Nov. 29, 1955

2,725,266

MAGNETIC SUSPENSION

Lewis I. Mendelsohn, Lynn, Mass., assignor to General Electric Company, a corporation of New York Application April 20, 1953, Serial No. 349,732

1 Claim. (Cl. 308—10)

My invention relates to magnetic suspension apparatus, and in particular to an improved magnetic suspension for horizontal rotating shafts.

It is known that rotating shafts may be supported wholly or in part by magnetic means, thereby minimizing difficulties encountered with conventional bearings. However, in magnetic suspension devices for horizontal shafts heretofore proposed, uniform magnetization of the suspension magnets has been difficult, magnets of relatively large radius are required to provide a high degree of radial stiffness, and locking torques which interfere with free rotation of the shaft have been encountered.

A principal object of my invention is to provide improved magnetic suspension apparatus for horizontal shafts in which the aforementioned difficulties are minimized, which is of small size and economical to manufacture, and which is well suited for application to gyroscopic devices and the like.

Briefly stated, in accordance with one aspect of my invention, I employ a plurality of axially aligned disk-shaped permanent magnets, of material having very high coercive force, magnetized in a direction parallel to the axis of the disks. The disks are arranged with a pole of one disk adjacent to the opposite pole of the next disk, thereby providing a strong attractive force which tends to keep the disks in axial alignment. The working faces of the permanent magnet disks are covered by flux distributors, hereinafter described, which assure a more uniform flux distribution and help to minimize locking torques.

Figure 2:
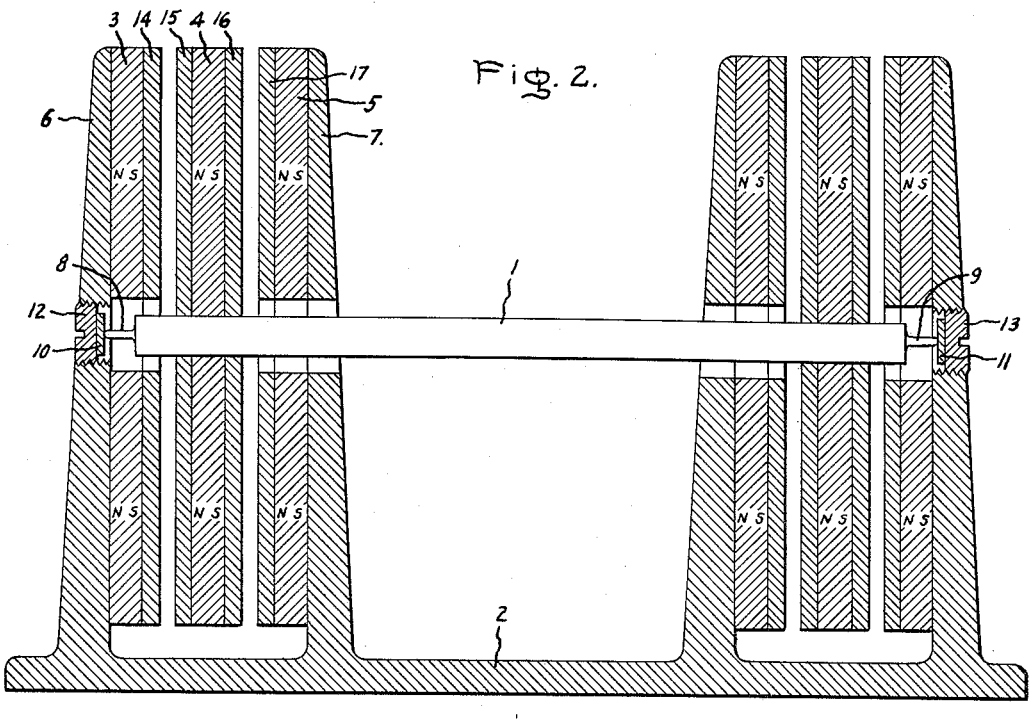
Figure 1:
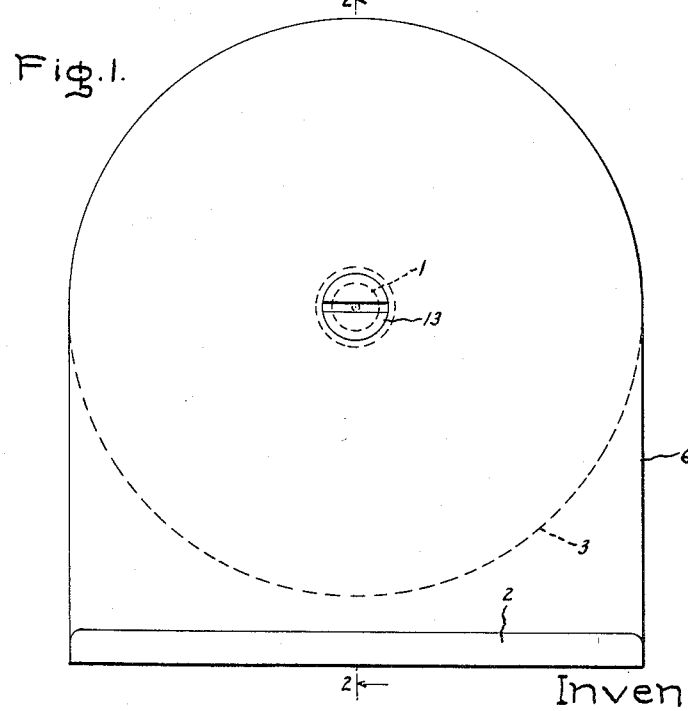

My invention will be better understood from the following description taken in connection with the accompanying drawing, and its scope will be pointed out in the appended claim. In the drawing, Fig. 1 is an end view of apparatus embodying principles of my invention; and Fig. 2 is a section taken generally along the line 2—2 of Fig. 1.

Referring now to the drawing, the horizontal shaft 1 is supported by two of my improved magnetic suspension devices, one at each end of the shaft. It will be understood that shaft 1 may support, or may be part of, any desired rotating equipment, not shown, such as the rotor of a gyroscope. Base 2 may be attached to, or a part of, any stationary part of the equipment. If desired, shaft 1 could be stationary, and base 2 could be rotatable about the axis of the shaft. Since the two magnetic suspension devices at respective ends of shaft 1 may be identical, only one will be described in detail.

The suspension device at the left-hand end of shaft 1 comprises three circular disk-shaped permanent magnets 3, 4, and 5, each magnetized in a direction parallel to the axis of the shaft and the disks. Thus, as indicated by the letters N and S in Fig. 2 of the drawing, the left-hand face of each disk-shaped magnet is a north pole, and the right-hand face of each magnet is a south pole. It will be noted that a pole of each magnet is adjacent to an opposite pole of the next magnet, thus providing an attractive force which tends to keep the magnets in axial alignment. Preferably, the center of magnet 4 is axially aligned with and attached to the shaft 1, and the remaining magnets 3 and 5 are held stationary in axial alignment by brackets 6 and 7, respectively, attached to base 2. Alternatively, magnets 3 and 5 may be attached to shaft 1, and magnet 4 may be suitably supported in fixed position by attachment to base 2. The magnets 3, 4 and 5 are held in substantial axial alignment by the force of magnetic attraction between the adjacent unlike poles of the magnets.

The base 2 is preferably made of annealed steel, and provides a return path for the magnetic flux. This substantially increases the magnetic flux density, and thus increases the radial stiffness of the suspension.

When magnet 4 is centered between magnets 3 and 5, the lateral force acting on magnet 4 is negligibly small. To keep magnet 4 in the centered position, pins 8 and 9, provided at respective ends of shaft 1 as shown, engage bearing surfaces 10 and 11 to provide a pair of thrust bearings which prevent substantial axial motion of shaft 1. The bearing surfaces 10 and 11 may be attached to the ends of screws 12 and 13, respectively, located within threaded holes in the end brackets. By turning screws 12 and 13, the axial position of shaft 1 can be adjusted to center magnet 4 accurately. Since the forces acting on the thrust bearings are small, the friction at these bearings is also small, and there is little tendency for the thrust bearings to wear. The weight of the shaft is supported by the magnetic attraction which tends to keep magnet 4 aligned with magnets 3 and 5.

As illustrated, each magnetic suspension device comprises three permanent magnets. However, it will be appreciated that only two magnets could be used, in which case the axial force on the shaft produced by a two-magnet suspension at one end of the shaft would be balanced by an opposite axial force provided by a similar magnetic suspension at the other end of the shaft. Alternatively, a larger number of magnets may be employed to support heavier shafts. In this case, alternate ones of the magnets will be attached to the shaft, and the remaining ones attached to base 2.

Since the magnetic path through each permanent magnet is quite short, the permanent magnets should be made of material having very high coercive force, preferably exceeding 1000 oersteds. I have found that an alloy comprising substantially 22% cobalt and 78% platinum, having a coercive force in the order of 4000 oersteds, is very satisfactory. Using this material, practical magnetic suspensions of very small size can be made. For example, each of the permanent magnets may be a disk about ¼ inch in diameter, and ¹⁄₁₀ inch in thickness. This small size not only makes the suspension compact, but also minimizes undesirable torques, such as locking torques. Another permanent magnet alloy which gives excellent results comprises substantially 22.2% iron and 77.8% platinum.

An important feature of my invention is the provision of disk-shaped flux distributors 14, 15, 16, and 17, covering the working faces of the magnets. These flux distributors are of high permeability low coercive force material, and are substantially unmagnetized except for the magnetic flux provided by the permanent magnets. For example, each of the flux distributors may be a disk of soft iron, Permalloy or Mu-metal. A preferred form of flux distributor is a disk-shaped layer of electrolytic iron plated on the magnet face. The purpose of these flux distributors is to distribute the magnetic flux more evenly over the face of the magnet, thus minimizing any inequalities due to unequal magnetization of different parts of the magnets. This minimizes the locking torques, which would otherwise tend to hold the magnets in certain angular positions.

As another alternative, the flux distributors may be made of bonded powdered iron pressed onto the magnets. The permeability of such distributors has excellent point-to-point uniformity, thereby minimizing locking torques and rotational hysteresis. The permanent magnets also may be advantageously made of bonded material. I have found that permanent magnets made of bonded cobalt-platinum powder have excellent uniformity. Such magnets, in combination with the flux distributors, reduce locking torques to a very low value.

In the embodiment illustrated, the two magnetic suspensions at respective ends of shaft 1 are identical. This is a suitable arrangement where the weight of the shaft is equally distributed between its two ends. If one end of the shaft were heavier than the other, it would be desirable to provide a suspension of greater radial stiffness at that end. This could be done by making the suspension larger, or more strongly magnetized, or with a greater number of permanent magnet disks.

It will be understood that my invention is not limited to the specific embodiment herein illustrated and described, and that the following claim is intended to cover all changes and modifications which do not depart from the true spirit and scope of the invention.

What I claim as new and desire to secure by Letters Patent of the United States is:

In combination, a horizontal rotatable shaft, thrust bearings preventing axial motion of said shaft, and a magnetic suspension for said shaft comprising three disk-shaped permanent magnets each magnetized in a direction parallel to the disk axis, said magnets being closely spaced apart, one from another, and arranged in substantial axial alignment with said shaft and in planes at right angles thereto, a pole of each magnet being adjacent to the opposite pole of the next magnet, disk-shaped flux distributors covering said adjacent poles, the center one of said magnets being attached to said shaft for rotation therewith, the remaining ones of said magnets being stationary, said magnets being of a material having a coercive force greater than 1000 oersteds, said flux distributors being of high permeability low coercive force material substantially unmagnetized except for the flux provided by said permanent magnets, and support means for said thrust bearings and for said stationary magnets.

References Cited in the file of this patent
UNITED STATES PATENTS

| | | |
|---|---|---|
| 2,188,091 | Baermann | Jan. 23, 1940 |
| 2,254,698 | Hansen | Sept. 2, 1941 |
| 2,315,408 | Faus | Mar. 30, 1943 |
| 2,582,788 | Mendelsohn | Jan. 15, 1952 |

OTHER REFERENCES

"Electronics," January 1948, pp. 122, 123.